United States Patent
Smith et al.

(10) Patent No.: US 12,363,541 B2
(45) Date of Patent: Jul. 15, 2025

(54) SYSTEM ARCHITECTURE FOR ACCESSING SECURE DATA FROM A MOBILE DEVICE IN COMMUNICATION WITH A REMOTE SERVER

(71) Applicant: AppBrilliance, Inc., Dripping Springs, TX (US)

(72) Inventors: Charles Eric Smith, Dripping Springs, TX (US); Sergio Gustavo Ayestaran, Buenos Aires (AR)

(73) Assignee: AppBrilliance, Inc., Dripping Springs, TX (US)

( * ) Notice: Subject to any disclaimer, the term of this patent is extended or adjusted under 35 U.S.C. 154(b) by 16 days.

(21) Appl. No.: 17/227,670

(22) Filed: Apr. 12, 2021

(65) Prior Publication Data

US 2021/0306857 A1    Sep. 30, 2021

Related U.S. Application Data

(63) Continuation of application No. 16/828,449, filed on Mar. 24, 2020, now Pat. No. 10,986,504.

(51) Int. Cl.
*H04W 12/30* (2021.01)
*G06F 9/54* (2006.01)
(Continued)

(52) U.S. Cl.
CPC .............. *H04W 12/35* (2021.01); *G06F 9/54* (2013.01); *G06F 16/955* (2019.01);
(Continued)

(58) Field of Classification Search
CPC ... H04W 12/35; H04W 12/03; H04W 12/068; H04W 12/08; H04W 12/06; G06F 9/54;
(Continued)

(56) References Cited

U.S. PATENT DOCUMENTS 6,976,149 B1 * 12/2005 Brandt ................ H04L 49/3009
711/209
8,223,741 B1 * 7/2012 Bartlett ................ H04W 40/00
370/349

(Continued)

OTHER PUBLICATIONS

Office Action for U.S. Appl. No. 16/828,449, mailed Aug. 14, 2020.
(Continued)

*Primary Examiner* — Abu S Sholeman
(74) *Attorney, Agent, or Firm* — Jason H. Vick; Amped IP LLC

(57) ABSTRACT

Systems, methods, and computer-readable storage devices to enable secured data access from a mobile device executing a native mobile application that operates in connection with a server executing a headless browser. The exemplary process includes receiving, at a server, at least registration data and browser state information, the registration data and the browser state information from a mobile device, a browser state database or a shared folder. The mobile device executing a native application and configured to host a configurable network service to connect to a website hosted by a remote server, the registration data including application identifier information associated with the native application and address data associated with the configurable network service. Then, establishing a secure connection between a headless browser, using the browser state information and the registration data, and the configurable network service, the headless browser comprising a web browser not having a corresponding displayed GUI.

7 Claims, 6 Drawing Sheets

(51) Int. Cl.
*G06F 16/955* (2019.01)
*H04L 9/40* (2022.01)
*H04W 12/03* (2021.01)
*H04W 12/06* (2021.01)
*H04W 12/08* (2021.01)

(52) U.S. Cl.
CPC ........... *H04L 63/083* (2013.01); *H04W 12/03* (2021.01); *H04W 12/068* (2021.01); *H04W 12/08* (2013.01); *H04L 2463/082* (2013.01)

(58) Field of Classification Search
CPC ................. G06F 16/955; H04L 63/083; H04L 2463/082; H04L 63/168; G06Q 20/108; G06Q 20/3221; G06Q 20/3223; G06Q 20/4014
See application file for complete search history.

(56) References Cited

U.S. PATENT DOCUMENTS

| | | | |
|---|---|---|---|
| 9,979,717 B2 | 5/2018 | Whiteside et al. | |
| 10,027,649 B2 | 7/2018 | Beecham | |
| 10,986,504 B1* | 4/2021 | Smith | G06Q 20/108 |
| 12,020,255 B1* | 6/2024 | Sahni | G06Q 20/4016 |
| 2007/0234041 A1 | 10/2007 | Lakshmeshwar et al. | |
| 2008/0010675 A1* | 1/2008 | Massacusa | G06F 21/6218 |
| | | | 726/9 |
| 2008/0010676 A1 | 1/2008 | Dosa Racz et al. | |
| 2011/0072274 A1* | 3/2011 | Leoutsarakos | H04L 9/3255 |
| | | | 713/182 |
| 2012/0216242 A1* | 8/2012 | Uner | G06F 21/51 |
| | | | 726/1 |
| 2014/0379925 A1* | 12/2014 | Kang | H04L 67/51 |
| | | | 709/226 |
| 2015/0046848 A1 | 2/2015 | Vohra et al. | |
| 2015/0149596 A1 | 5/2015 | Hepper et al. | |
| 2015/0271188 A1* | 9/2015 | Call | H04L 67/01 |
| | | | 726/22 |
| 2016/0094546 A1 | 3/2016 | Innes et al. | |
| 2016/0359861 A1* | 12/2016 | Manov | G06F 21/335 |
| 2017/0032362 A1 | 2/2017 | Lahkar et al. | |
| 2017/0093828 A1* | 3/2017 | Lupien | H04L 63/08 |
| 2017/0289809 A1 | 10/2017 | Smith et al. | |
| 2017/0346804 A1 | 11/2017 | Beecham | |
| 2017/0346830 A1* | 11/2017 | Goldfarb | H04L 67/01 |
| 2018/0026964 A1* | 1/2018 | Child | H04L 63/0884 |
| | | | 726/8 |
| 2018/0113858 A1 | 4/2018 | Peng et al. | |
| 2018/0123934 A1 | 5/2018 | Gissing et al. | |
| 2018/0267847 A1 | 9/2018 | Smith et al. | |

OTHER PUBLICATIONS

Office Action for U.S. Appl. No. 16/828,449, mailed Dec. 10, 2020.
Notice of Allowance for U.S. Appl. No. 16/828,449, mailed Feb. 3, 2021.
International Preliminary Report on Patentability for International Application No. PCT/US2021/023124, mailed Oct. 6, 2022.
International Search Report for International Application No. PCT/US2021/023124, mailed Apr. 14, 2021.
Written Opinion for International Application No. PCT/US2021/023124, mailed Apr. 14, 2021.
Office Action for Canadian Patent Application No. 3,173,102, mailed Feb. 23, 2023.
Notice of Allowance for Canadian Patent Application No. 3,173,102, mailed Jul. 17, 2023.
European Search Report for corresponding European Patent Application No. 21775940.6, mailed Mar. 11, 2024.
Notice of Allowance (Including Translation) for Mexican Patent Application No. MX/A/2022/011913, mailed Feb. 20, 2024.
Notice of Acceptance for corresponding South African Patent Application No. 2022/10582, mailed Aug. 22, 2024.

* cited by examiner

SYSTEM ARCHITECTURE FOR ACCESSING SECURE DATA FROM A MOBILE DEVICE IN COMMUNICATION WITH A REMOTE SERVER

CROSS-REFERENCE TO RELATED APPLICATIONS

This application claims priority from and is a continuation of U.S. patent application Ser. No. 16/828,449, filed Mar. 24, 2020, now U.S. Pat. No. 10,986,504, the entire contents of which is incorporated herein by reference in its entirety.

BACKGROUND

As mobile devices become commonplace, users elect to perform more and more day-to-day tasks using mobile devices. For example, users may use mobile devices to work on projects that were typically reserved for desktop or laptop computers, such as editing documents and spreadsheets, creating drawings or graphic designs, generating multimedia content, etc. For a mobile device to perform certain tasks, the mobile device may need access to secured user data. However, due to security considerations and pre-existing back-end systems, providing mobile devices access to such secured user data may be challenging.

To illustrate, one day-to-day task in which mobile devices may be used is mobile banking. Increasingly, banking customers prefer to use a mobile device application to manage their money. As a result, banks are deploying mobile banking applications. For small and mid-size banks, it may be prohibitively expensive to develop a customized and full-featured mobile banking application (e.g., via in-house development or by hiring a third party development team), including setting up back-end security features and data integrations that enable such an application to access secured data, such as pre-existing account data, data stored in data warehouses, etc. To provide mobile banking for small and mid-size banks, some vendors use account aggregation, which involves storing user credentials for a bank on an intermediary server and then accessing the bank via the intermediary server. However, the account aggregation approach does not function properly if the bank blocks such accesses from third-party servers for security reasons. To illustrate, if the bank is able to identify multiple accesses coming from the same internet protocol address, the bank may block all accesses from the internet protocol address, thereby preventing the account aggregation technique from functioning. Storing user access credentials on intermediary servers (e.g., in the cloud) can also be a security risk. Additionally, processing power and battery life of some mobile devices can lead to challenges in creating mobile banking applications. For example, some devices, such as computerized watches, may lack sufficient processing resources and battery power to support a full-featured mobile banking application.

DETAILED DESCRIPTION

Figure 1:
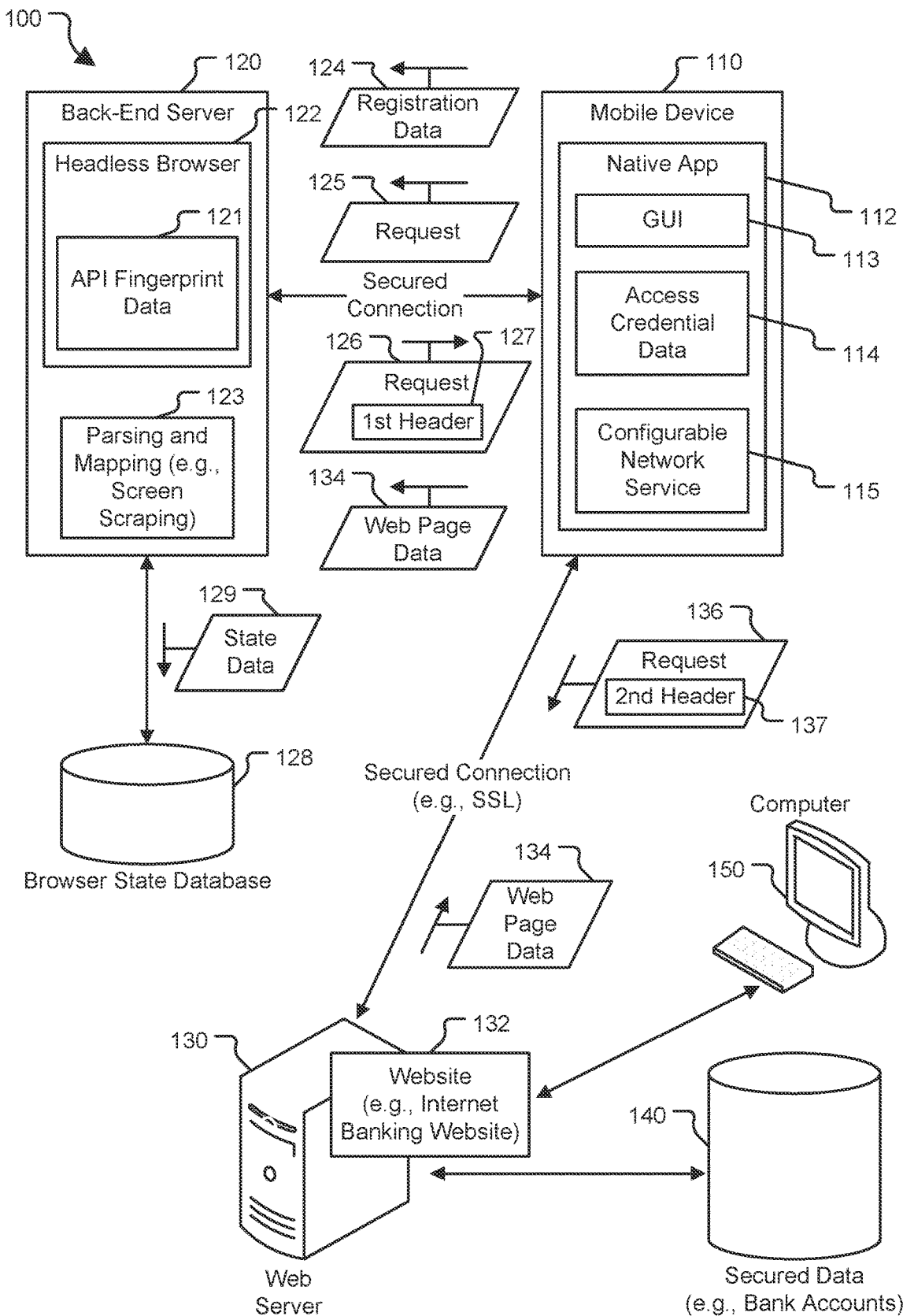
FIG. 1 is a diagram of an illustrative aspect of a system that supports secured data access from a mobile device executing a native application that is integrated with a server executing a headless browser.

The present disclosure enables read and write access to secured data by a mobile device that executes a "native" mobile application (alternatively referred to herein as a "mobile app") and that is supported by a back-end server executing a "headless" browser. As used herein, a "native" mobile app is an application that is designed and coded for a specific device platform, such as for a specific mobile device operating system. Because native apps are created for a specific platform, native apps typically have the same "look and feel" as the underlying operating system and provide more reliable and faster performance than non-native apps. Native apps may also have access to device functionality that is unavailable to non-native apps. In addition, many mobile platform vendors offer storefronts from which users can download native apps. To encourage native app development, platform vendors often offer standardized software development kits (SDKs).

As used herein, a "headless browser" is an instance of a web browser that is executed by a device without display of a graphical user interface (GUI). Thus, while the headless browser may be used to send and receive web data (e.g., via hypertext transfer protocol (HTTP) GET commands, POST commands, etc.), the headless browser itself may not display such web data. Instead, as further described herein, a headless browser may serve as a web access mechanism for a native app on a mobile device.

In particular aspects, the systems and methods of the present disclosure enable a mobile device and one or more back-end servers to access secured data, such as bank account data, without requiring a provider of the data (e.g., a bank) to implement a technology integration between a mobile solutions provider (e.g., a developer or vendor of a mobile app) and an internet banking software/website provider. Such integrations, which may involve establishing security protocols, data encryption, standards-compliant application programming interfaces (APIs), and/or coordination between different vendors while maintaining compatibility with legacy banking systems, can be complex and expensive. Although various aspects are described herein in the context of banking and financial operations, such descriptions are for illustration only and are not to be considered limiting. The techniques of the present disclosure may additionally or alternatively be used to enable mobile device access to secured data other than banking/financial data, such as healthcare data, enterprise data, etc.

In accordance with the described techniques, a mobile device and a server may work in tandem to access secured data from a remote server, such as a remote banking server. To illustrate, a mobile device may utilize a native application to provide mobile banking functionality. In a particular implementation, the native application communicates with a server (e.g., a back-end server) via a secure connection to enable the server to access a website hosted by a remote server (e.g., a remote banking server) and to appear as though only the mobile device is accessing the remote server. For example, the mobile device may host a configurable network service that is configured to act as an intermediary between the server and the remote server, such as by receiving messages or commands (e.g., HTTP GET and HTTP POST commands, as non-limiting examples) from the server and providing the messages or commands to the remote server after modifying the messages or commands such that the messages or commands appear to have originated at the mobile device. In this manner, the remote server may be unaware of the operation of the back-end server, and thus may allow the messages to proceed unblocked.

To further illustrate, the server (e.g., the back-end server) may execute a headless browser that communicates over a secure connection (e.g., an encrypted network tunnel) with the configurable network service. The server may receive requests or commands from the mobile device executing the native application. For example, the native application may generate a request to logon to the website based on user input, and the request is sent from the mobile device to the server. The server may instantiate a headless browser and inject application programming interface (API) fingerprint data based on the website into the headless browser. The API fingerprint data may indicate service pathways and other elements that map elements of the native application to elements of the website. For example, the API fingerprint data may indicate service pathways and elements associated with a logon to the website. The server may utilize the headless browser to send a request to logon to the website by sending the request to the configurable network service of the mobile device. The configurable network service receives the request and modifies the request such that the request appears to originate at the mobile device before sending the request to the remote server (e.g., a third-party server, such as a remote banking server). When the mobile device receives a response to the request, the configurable network resource forwards the response to the server (e.g., the back-end server) for processing via the headless browser. After processing the response, the server sends information to the native application at the mobile device that the logon is complete. In this manner, the server (e.g., the back-end server) operates "through" the configurable network resource of the mobile device to access the website. Because the access appears to come from the mobile device (e.g., from a customer of the bank that operates the remote server), the bank is not likely to block the mobile device for security reasons, as compared to blocking the back-end server if the back-end server attempted to access the website directly.

In this manner, the native mobile application at the mobile device may communicate with the back-end server to enable access to secured data and to enable various features associated with a website, such as an internet banking website. For a native mobile banking application, the native application may enable features such as account balance reporting, viewing transaction history per account, transferring funds between accounts, performing remote check deposits, paying bills, etc. In some examples, the native mobile banking application may have an API to enable integration with (and thereby enable access to) other software and functionality, such as software for peer-to-peer funds transfers, contact-less automated teller machine (ATM) authentication, loan applications, etc.

In some aspects, an API may link the native app at the mobile device to the headless browser at the back-end server to provide a consistent way of implementing customer-facing features and reading/writing data between the native app and servers (e.g., servers associated with a provider of the native app, third party servers, servers hosting an internet banking website, etc.). The native mobile app, the headless browser, and the API may create a personalized data integration, such as for a particular user's bank account, directly from the app.

In some aspects, user access credentials and other access data (such as personal identification numbers (PINs), multifactor authentication codes, etc.) may be input into the native app and then passed to the headless browser by way of an embedded API. This API may include: (1) a common set of functions and data for user authentication or account information, which may be standardized across financial institutions; and (2) the specific website for the financial institution, including specific page layout, hypertext markup language (HTML), cascading style sheets (CSS), and/or JavaScript content that would typically be interpreted by a personal computer (e.g., non-mobile) browser and presented to a user as an internet banking website. The API may be based on API fingerprint data that is embedded (e.g., injected) into the headless browser to enable the headless browser to pass user interactions and data back and forth with the website (or the remote server hosting the website) via the mobile device (e.g., via the configurable network resource executed at the mobile device). Thus, the headless browser at the back-end server may be used to emulate operations performed by a non-headless browser on a desktop or laptop computer or by a non-headless mobile browser directly accessing the website.

In some examples, the API fingerprint data may be configured on a per-app basis so that mappings between banking features in the native app and their corresponding internet banking elements on the website may be established, such as via screen-scraping. Thus, the techniques of the present disclosure may enable an embedded API to be configured for each version of internet banking services/websites to reach a large population of bank users. Configuring embedded APIs in this manner may be simpler than building custom native apps and integrations for each financial institution, because there may only be a few dozen versions of internet banking services/website, whereas there are over 14,000 financial institutions in the United States alone. The systems and methods described herein may provide a technique for end-users to securely and efficiently access internet banking capabilities via a native mobile banking app while leveraging a secure real-time connection to internet banking rather than requiring access to a dedicated, expensive, or limited integration specific to the app. Moreover, the present disclosure may enable operations to be off-loaded from the mobile device to a server, which may reduce processing resources used by the mobile device in executing the native mobile app, which may reduce power consumption at the mobile device.

Although aspects of the present disclosure are described in the context of mobile banking, such description is not limiting. In other implementations, the systems and methods described herein enable access to any type of secured data. As a particular example, aspects of the present disclosure may enable a mobile device and back-end server to access secured data with an online merchant, such as an online retailer. The secured data may include account balances, order histories, current orders, or other information. As another particular example, aspects of the present disclosure may enable a mobile device and back-end server to access secured data on a private network, such as an employer's private network. Thus, aspects of the present disclosure enable access to multiple types of secure data.

Referring to FIG. 1, an illustrative aspect of a system is shown and generally designated 100. The system 100 includes a mobile device 110, such as a mobile phone, a tablet computer, a personal digital assistant, a wearable computing device, a portable media player, a computing device of a vehicle, etc. The mobile device 110 includes a memory that stores processor-executable instructions and data corresponding to one or more applications ("apps"). For example, the mobile device 110 may include a native app 112. The mobile device 110 also includes a processor configured to execute the processor executable instructions. The mobile device 110 also includes a wireless transceiver configured to communicate with one or more other devices.

In some examples, as further described herein, the native app 112 may be a "branded" version of a mobile banking application that is specific to a financial institution, such as a specific bank or a specific credit union. In a particular aspect, a user of the mobile device 110 may download the native app 112 from an app storefront. In some examples, the native app 112 may be generated based on a generic native app template by adding branding components, such as names, logos, color schemes, typeface schemes, etc. For mobile banking, the native app 112 may be configured to perform banking operations such as an account balance operation, a fund transfer operation, a credit card payment operation, a deposit operation, a withdrawal operation, a bill pay operation, a transaction history operation, etc.

The system 100 includes a back-end server 120. The back-end server 120 (which may correspond to multiple back-end servers in alternative examples) is configured to interact with the mobile device 110 to support the native app 112. For example, the back-end server 120 may execute a headless browser 122 that provides back-end integration and supports functionality for the native app 112, as further described herein. To further illustrate, information generated by the headless browser 122 may be passed from the back-end server 120 to the mobile device 110 for transmission to another device, as further described herein. The headless browser 122 does not include a GUI displayed to a user, although the native app 112 may have a GUI 113 displayed to a user. The back-end server 120 includes a processor and a memory that stores processor-executable instructions to perform one or more of the operations described herein. The back-end server 120 also includes a transceiver configured to communicate with one or more devices, such as the mobile device 110 or a third-party server, via one or more networks, such as the Internet.

The system 100 also includes a web server 130 located remote to the mobile device 110. The web server 130 (which may correspond to multiple web servers in alternative examples) may be configured to host a website 132. In particular examples, the website 132 may be an internet banking website. In some aspects, the website 132 may be a "desktop" version of an internet banking website. To illustrate, the website 132 may deliver content that is formatted for presentation on a desktop or laptop computer, rather than a mobile version of such content that is formatted for presentation on a mobile device. Thus, in some aspects, the website 132 may typically be used by users at computers, such as an illustrative computer 150, to log in to their financial institution and perform internet banking functions. In other aspects, the website 132 may have content formatted for presentation on a mobile browser. The website 132 may enable a user of the computer 150 to access secured data 140, such as information regarding bank accounts. As another example, the website 132 may enable a user of the computer 150 to view account balances, transaction histories, and credit card information. As yet another example, the website 132 may enable a user of the computer 150 to transfer funds between accounts.

During operation, the mobile device 110 and the back-end server 120 may work together to use the website 132 to access the secured data 140, even if the website 132 includes content that is not formatted for mobile devices. To illustrate, the native app 112 may launch a configurable network service 115 to enable communications between the back-end server 120 and the website 132 (or the web server 130). The configurable network service 115 is configurable to receive information or user interactions from the mobile device 110 and to pass the information or user interactions to the web server 130 while modifying the information or user interactions to appear as though they originated at the mobile device 110. For example, a header of a message may be modified to indicate the mobile device 110 as the originator of the message instead of the back-end server 120. To illustrate, an IP address or other identifying information associated with the back-end server 120 may be replaced with an IP address or other identifying information associated with the mobile device 110. Thus, the configurable network service 115 may provide anonymity to the back-end server 120. The configurable network service 115 also receives responses or data from the web server 130 and forwards the responses or data to the back-end server 120, as further described herein.

The native app 112 is configured to launch the configurable network service 115 upon startup (e.g., execution). After initializing the configurable network service 115, the native app 112 generates registration data 124 as part of a registration process with the back-end server 120. The registration data 124 indicates an application identifier (e.g., a unique app ID) associated with the native app 112. The registration data 124 also indicates address data associated with the configurable network service 115. For example, the registration data 124 may indicate an internet protocol (IP) address and port assigned to the configurable network service 115. The mobile device 110 sends the registration data 124 to the back-end server 120 to register the native app 112 with the back-end server 120. In some implementations, the registration data 124 includes credential data that indicates one or more credentials (e.g., a username, a password, etc.) that enable secure access to the configurable network service 115. The credential data may be used to authenticate the back-end server 120 (or other associated back-end servers) during setup of a secure connection between the back-end server 120 and the configurable network service 115. Other devices lack the credential data and are unable to connect to the configurable network service 115. In a particular implementation, the credential data indicates a randomly generated combination of random strings that are passed to the back-end server 120 as part of the registration data 124. In other implementations, the registration data 124 does not include the credential data and other methods are used to authenticate devices that attempt to establish a connection with the configurable network service 115. As a non-limiting example, a secure handshaking protocol may be used to authenticate the back-end server 120 during setup of a secure connection with the configurable network service 115.

The back-end server 120 is configured to use the registration data 124 to launch the headless browser 122. For example, the back-end server 120 may instantiate an instance of the headless browser 122 based on the registration data 124. To illustrate, the back-end server 120 may instantiate the headless browser 122 and may associate the headless browser 122 and relevant information, such as cookies, caches, and the address information with the application identifier. By using the application identifier to associate the headless browser 122 with the other information, the back-end server 120 is enabled to associate the headless browser 122 with the mobile device 110 without storing any personal or identifiable information about a user of the mobile device 110. For example, the registration data 124 (including the optional credential data) is distinct from access credential data, such as a username and password, used to access the website 132. Storing such personal information may require heightened security, in accordance with one or more regulations or other rules.

The back-end server 120 initiates a secure connection between the headless browser 122 and the configurable network service 115 based on the registration data. For example, the back-end server 120 may initiate a secure connection between an IP address and port at the back-end server and the IP address and port corresponding to the configurable network service 115 (and indicated by the registration data 124). In a particular implementation, the secure connection is an encrypted network tunnel. To illustrate, the encrypted network tunnel may be created using the secure shell (ssh) protocol, thereby encrypting the network tunnel (e.g., by use of ssh). The secure connection is initiated upon the back-end server 120 receiving a first request from the native app 112. The secure connection may be initialized using the registration data 124 (e.g., the credential data) to provide security (e.g., to prevent unauthorized devices from accessing the configurable network service 115). Once the secure connection is established, the secure connection remains configured to use the configurable network service 115 until the native app 112 is closed, at which time the secure connection is "torn down" (e.g., disabled). In a particular implementation, upon change of the IP address or port associated with the mobile device 110 and the configurable network service 115, the native app 112 updates the registration data 124, and the secure connection is reconfigured based on the updated registration data 124.

When a user of the mobile device 110 interacts with the native app 112, the native app 112 may issue a request 125. For example, a user of the mobile device 110 may attempt to login to the user's bank using the native app 112. The native app 112 may generate the request 125 for logging on to the website 132. Although a request for login is described, the request 125 may be any type of request, such as a request for data from a particular webpage or a request for a command to be performed, such as a request to perform a transaction (e.g., a bill-pay request, a funds-transfer request, etc.).

In a particular implementation, the request is a request to login to the website 132. In this implementation, the request 125 includes access credential data 114. To illustrate, the native app 112 may send a username and password of the user to the back-end server 120. In some examples, the access credential data 114 is received via a user input device of the mobile device 110, such as a touchscreen. Alternatively, the access credential data 114 may be retrieved from a memory of the mobile device 110.

The request 125 is sent from the mobile device 110 to the back-end server 120. The back-end server 120 receives the request 125 and the headless browser 122 generates a second request 126 based on the request 125. For example, the headless browser 122 may generate a request for information or may initiate performance of a requested command. To illustrate, the back-end server 120 may use the headless browser 122 to emulate a request to login to the website 132 from a non-headless browser, such as a browser of a computer (e.g., the computer 150) in the case of a desktop internet banking website, or a browser of the mobile device 110 in the case of a mobile internet banking website. The second request 126 includes a first header 127 that indicates the back-end server 120 is the originator of the second request 126. As described above, in a particular implementation, the second request 126 is a request to login to the website 132. In this implementation, the second request 126 indicates the access credential data 114. To illustrate, the request 125 from the native app 112 may cause the headless browser 122 to request a login page of the website 132 and send the username and password to the website 132, such as by using HTTP GET/POST commands or other commands. The access credential data 114 (e.g., the username and password) is only used to generate the second request 126 and afterwards is discarded. In a particular implementation, the access credential data 114 is not stored at the back-end server 120. This may improve security of the user, because the access credential data 114 is not stored and therefore is not possible to be retrieved by a malicious intruder. In alternate implementations, the back-end server 120 implements a secure storage, in accordance with one or more guidelines or regulations, and the access credential data 114 is stored at the back-end server 120.

The headless browser 122 may access application programming interface (API) fingerprint data 121 to generate the second request 126. The API fingerprint data 121 includes data that indicates a mapping between the website 132 and the native app 112. For example, the API fingerprint data for the website 132 indicates mappings between features of the website 132 and one or more elements (buttons, fields, screens) of the GUI 113 of the native app 112. As an illustrative example, the API fingerprint data 121 indicates a mapping between the website 132 and the native app 112 for a username, a password, a login button, or a combination thereof. The API fingerprint data 121 may also identify the address (e.g., a uniform resource locator (URL) address) of the website 132 or a particular page of the website 132, such as a login page. The API fingerprint data 121 also may include a "fingerprint" of the internet banking service pathways used for a user to log in, authenticate, and take other actions possible with internet banking. To further illustrate, the API fingerprint data 121 may indicate service pathways used during a multi-factor authentication, if such authentication is used to enable access to the website 132. The API fingerprint data 121 may be used to form an "embedded" (or "injected") API between the native app 112 (through the headless browser 122) and the website 132 (e.g., even though there is no actual API between the native app 112 and the website 132). For example, the API fingerprint data 121 enables the native app 112 to communicate, through the headless browser 122, with the website 132 as though the native app 112 was designed for use with the website 132.

In some implementations, a database of API fingerprint data (including the API fingerprint data 121) is accessible to the back-end server 120, and the back-end server 120 retrieves particular API fingerprint data based on an identifier associated with the website 132, such as a name (or partial name) of a financial institution or an address of the website 132, as non-limiting examples. Alternatively, the back-end server 120 may be configured to generate the API fingerprint data 121 by performing one or more screen scraping operations, one or more Javascript injection operations, one or more operations in accordance with another programming language, one or more document object model (DOM) inspection operations, or a combination thereof, on data that is retrieved from the website 132. The data may be retrieved from the website 132, as further described herein.

After generating the second request 126, the back-end server 120 sends the second request 126 to the configurable network service 115 of the mobile device 110 for transmission to the web server 130. The second request 126 corresponds to the website 132. As a particular example, the second request 126 may include a request to login to the website 132. However, instead of sending the second request 126 directly to the web server 130, the back-end server 120 sends the second request 126 to the mobile device 110 (e.g., to the configurable network service 115). For example, the back-end server 120 may send the second request 126 via the secure connection between the headless browser 122 and the configurable network service 115.

The mobile device 110 receives the second request 126 (e.g., a first data packet) from the back-end server 120. The mobile device 110 modifies the second request 126 to generate a third request 136 (e.g., a modified first data packet). For example, the configurable network service 115 may modify the first header 127 to generate a second header 137 of the third request 136. The second header 137 indicates the mobile device 110 as the originator of the third request 136. To further illustrate, the configurable network service 115 modifies the first header 127 to remove any address (e.g., IP address) or identifying information associated with the back-end server 120 and replace such information with an address of the mobile device 110 (or other identifying information).

The mobile device 110 initiates formation of a secure connection from the configurable network service 115 to the website 132. In a particular implementation, the secure connection is a secure sockets layer (SSL) connection. After forming the secure connection, the mobile device 110 sends the third request 136 to the website 132.

The web server 130 receives the third request 136 and processes the third request 136. In a particular implementation, the third request 136 is a request to login to the website 132 and indicates the access credential data 114. The web server 130 may receive the access credential data 114 from the native app 112 for verification. To illustrate, the web server 130 may include software configured to compare the access credential data 114 to previously-stored access credential data. Alternatively, the web server 130 may forward the access credential data 114 to an authentication server. In some specific implementations the access credential data is stored in the device secure element (keychain or key store) and sent to the web server for a brief period to proceed with the logon operation. After the access credential data 114 is verified, the web server 130 may transmit web page data 134 to the configurable network service 115. For example, the web page data 134 may correspond to the web page of the website 132 that would be sent to the computer 150 after a user of the computer 150 completed a login process of the website 132. Thus, the web page data 134 may include user-specific data, such as the user's name, the user's account number(s), account balance(s), and/or other information corresponding to one or more of the user's checking accounts, savings accounts, credit card accounts, money market accounts, loan accounts, investment accounts, etc.

The configurable network service 115 receives the web page data 134 and forwards the web page data 134 to the back-end server 120 for parsing by the headless browser 122. For example, the configurable network service 115 may send the web page data 134 to the headless browser 122 via the secured connection. The back-end server 120 receives the web page data 134 from the mobile device 110 (e.g., from the configurable network service 115) and processes the web page data 134. For example, the back-end server 120, using the headless browser 122, may parse the web page data 134 to identify user-specific data. To further illustrate, the back-end server 120 may include a parsing and mapping component 123 that is configured to parse web page data to identify user-specific data and to identify elements to be mapped to the native app 112. For example, the parsing and mapping component 123 may perform screen scraping or web scraping operations on the web page data 134 to identify user-specific data, such as the user's name, the user's account number(s), account balance(s), or other information. In some examples, the headless browser may access mappings (e.g., the API fingerprint data 121) between various web pages and features of the website 132 and corresponding GUI elements (e.g., fields, buttons, screens, etc.) of the native app 112. To illustrate, such mappings may be determined using a screen-scraping operation. Thus, different versions of the native app 112 may be deployed for different financial institutions, different internet banking websites or services, etc. Although illustrated as external to the headless browser 122, the parsing and mapping component 123 may use the headless browser 122 to perform operations, such as screen scraping operations, web scraping operations, or Javascript injection operations, as non-limiting examples. Thus, the parsing and mapping component 123 may be internal to the headless browser 122, in some implementations.

After identifying the user-specific information, the back-end server 120 sends the user-specific information to the native app 112 for display in the GUI 113 of the native app 112. For example, the GUI 113 may display the user's name, the user's account number(s), account balance(s), or other information. In this manner, the mobile device 110 and the back-end server 120 are able to provide mobile banking functionality at the mobile device 110 via the native app 112. Although a login operation has been described, other types of operations may proceed in a similar manner. For example, responsive to receiving a command to perform a transaction (e.g., to pay a bill, to transfer funds, etc.), the native app 112 sends transaction data to the headless browser 122 at the back-end server 120. The headless browser 122 sends the transaction data to the configurable network service 115 for transmission to the web server 130. Prior to sending the transaction data, the configurable web server modifies the transaction data such that the transaction data appears to originate from the mobile device 110. After the modification, the configurable network service 115 at the mobile device 110 sends the transaction data to the website 132 for processing. If additional web page data (e.g., a confirmation) is received in response to sending the transaction data, the configurable network service 115 passes the addition web page data to the headless browser 122 at the back-end server 120 for parsing, and any user-specific data (or other displayable data) is provided from the back-end server 120 to the native app 112 for display via the GUI 113. Thus, the native app 112 is able to support various online banking functionality by working together with the back-end server 120.

During operation of the headless browser 122 at the back-end server 120, persistent state data 129 may be generated. The persistent state data 129 includes one or more cookies associated with a logon to the website 132. The persistent state data 129 may also include caches (or other temporarily stored data), such as user transaction data, images, and/or metadata. This information may be stored in a database when the native app 112 is closed such that the next time the native app 112 is launched, the information may be retrieved and loaded into the session of the headless browser 122 to avoid a login process (which may include multi-factor authentication) or to avoid the multi-factor authentication on login (since after the first login, the mobile device 110 will be a known device for a given user) with the website 132. For example, the back-end server 120 may receive, from the mobile device 110, an indication that the native app 112 is closed. Responsive to the receiving the indication, the back-end server 120 stores the persistent state data 129 in a browser state database 128. In a particular implementation, the browser state database 128 is external to and accessible to the back-end server 120. In other implementations, the browser state database 128 is stored at the back-end server 120. In some implementations, the data stored in the browser state database 128 is encrypted prior to storage.

The stored persistent state data 129 may be used when the native app 112 is launched again. For example, when the native app 112 is launched, the native app 112 sends the registration data 124 to the back-end server 120. After receiving the registration data 124, the back-end server 120 accesses the browser state database 128 to determine whether persistent state information is found for a particular application identifier associated with the native app 112 (and indicated by the registration data 124). Responsive to the persistent state data 129 being found (e.g., responsive to a match between the application ID indicated by the registration data 124 and an application ID associated with the persistent state data 129), the persistent state data 129 is retrieved and loaded into the instance of the headless browser 122. Because the persistent state data 129 includes one or more cookies associated with a logon to the website 132, the persistent state data 129 enables the headless browser 122 to connect (via the configurable network service 115) to the website 132 without having to perform an authentication process, which may include a multi-factor authentication process, or a multi-factor authentication process after a first login may be skipped because, after the first successful login, the mobile device 110 is a known device for a given user. For example, a user may be logged out of the website 132 after a particular time period (e.g., 10 to 15 minutes) of inactivity, and upon logging back in to the website 132, the user may skip a multi-factor authentication because the headless browser 122 uses the cookie(s) to cause re-authentication of the mobile device 110 by the web server 130. Additionally, if there are multiple back-end servers, a headless browser session can be recreated on a different back-end server at a later time through use of the persistent state data 129.

In an alternate implementation, the persistent state data 129 is stored at the mobile device 110. For example, the back-end server 120 sends the persistent state data 129 to the mobile device 110 after receiving the indication that the native app 112 is to be closed, and the mobile device 110 stores the persistent state data 129 at a memory. In this alternate implementation, the mobile device 110 may provide the persistent state data 129 to the back-end server 120 the next time the native app 112 is launched.

It will be appreciated that by emulating a computer login to the website 132 and displaying user-specific information in the GUI 113, the native app 112 (interacting with the headless browser 122 at the back-end server 120) may enable read access to the secured data 140 by a user of the mobile device 110. The techniques of the present disclosure are not limited to read-only access. For example, during operation of the native app 112, the native app 112 may receive a user command, such as a command to transfer funds between two accounts, as an illustrative non-limiting example. In response, based on information from the native app 112, the headless browser 122 sends transaction data to the configurable network service 115 for transmission to the website 132 via a secured connection, where the transaction data indicates a modification to be made to the secured data 140. For example, the transaction data may correspond to HTTP command(s) that would be issued by the computer 150 when requesting a funds transfer operation on the website 132. Thus, from the perspective of the website 132, there is no difference between transaction data originating from a computer and the transaction data sent by the configurable network service 115 at the mobile device 110. Upon receiving the transaction data, the web server 130 may take action to modify the secured data 140 (e.g., may initiate the funds transfer operation). After the modification to the secured data 140 is performed, the website 132 may transmit a transaction confirmation to the mobile device 110 to confirm the modification to the secured data 140 (e.g., completion of the funds transfer operation), and the transaction confirmation may be provided to the back-end server, processed by the back-end server, and optionally sent to the mobile device 110 for display in the GUI 113 of the native app 112. The new balances of the user's accounts may also be displayed in the GUI 113 the next time the native app 112 (in combination with the back-end server 120) performs a read operation on the secured data 140.

In some examples, the native app 112 may enable access to additional software and functionality that is not typically available via the internet banking website 132. For example, the native app 112 may include separate capabilities or integrations to interact with other software and the underlying hardware of the mobile device 110, or with third party service(s) or device(s) via hardware/software interfaces on the mobile device 110. To illustrate, the native app 112 may have an integration with an automated teller machine (ATM) software provider or network and may utilize a short-range wireless transceiver of the mobile device 110 to perform contactless authentication with an ATM.

As another example, the native app 112 may access the internet via a secure network connection and may interact with an external service, such as a peer-to-peer fund transfer service, directly rather than relying on an API to communicate with the internet banking website 132. To illustrate, consider two users that have native apps on their mobile devices, where the native apps operate in accordance with the present disclosure. The native apps may be for the same financial institution or may be for (and thus including branding associated with) different financial institutions. Each user may interact with the native app on their mobile device, where the native app is integrated with a third party peer-to-peer fund transfer service (although the peer-to-peer fund transfer service does not have an integration with the bank(s)). The native apps may have access to each user's account information, such as clearinghouse/routing and/or debit/credit card information. For example, such information may previously have been provided by the users or may have been determined from using a headless browser to interact with the banking websites of the bank(s). This information and the native apps may be used to facilitate transfer of money by way of the third party peer-to-peer service. In some aspects, having the two mobile devices in close proximity may be used for a secure and local discovery option in lieu of requiring entry of account information. To illustrate, for mobile devices in close proximity that are executing their respective native mobile banking apps, authentication may be automatic. If the mobile devices are not executing the apps, the apps may nonetheless "discover" each other via a device feature or service, global positioning system (GPS), short-range wireless networking, application-level handshaking, etc. To illustrate, the native app may request the mobile device to "show all users that are have compatible mobile banking apps in discovery mode, have registered with a third party server in the last thirty seconds, and have GPS coordinates within one meter of me").

The system 100 of FIG. 1 may thus enable read and write access to the secured data 140 by the native app 112 without requiring a dedicated back-end integration between the native app 112 and legacy banking systems. Because some operations (e.g., operations of the headless browser 122) are offloaded from the mobile device 110 to the back-end server 120, the native app 112 may use less processing resources than implementations where all the operations are performed by the mobile device 110, which reduces power consumption at the mobile device 110. Due to the reduced power consumption, the native app 112 may be executable at devices having more stringent power requirements, such as computerized watches or other devices. Additionally, because the configurable network service 115 provides anonymity to the back-end server 120 (e.g., because accesses to the website 132 appear to originate at the mobile device 110 instead of at the back-end server 120), an institution that provides the website 132 is unlikely to block accesses by the mobile device 110. An additional benefit is improved security as compared to systems that store the access credential data 114 at the back-end server 120. Further, performance and/or a user experience may be improved by virtue of utilizing the native app 112 instead of a web app, hybrid app, or conventional web page accesses (e.g., as would be performed by the computer 150).

Figure 2:
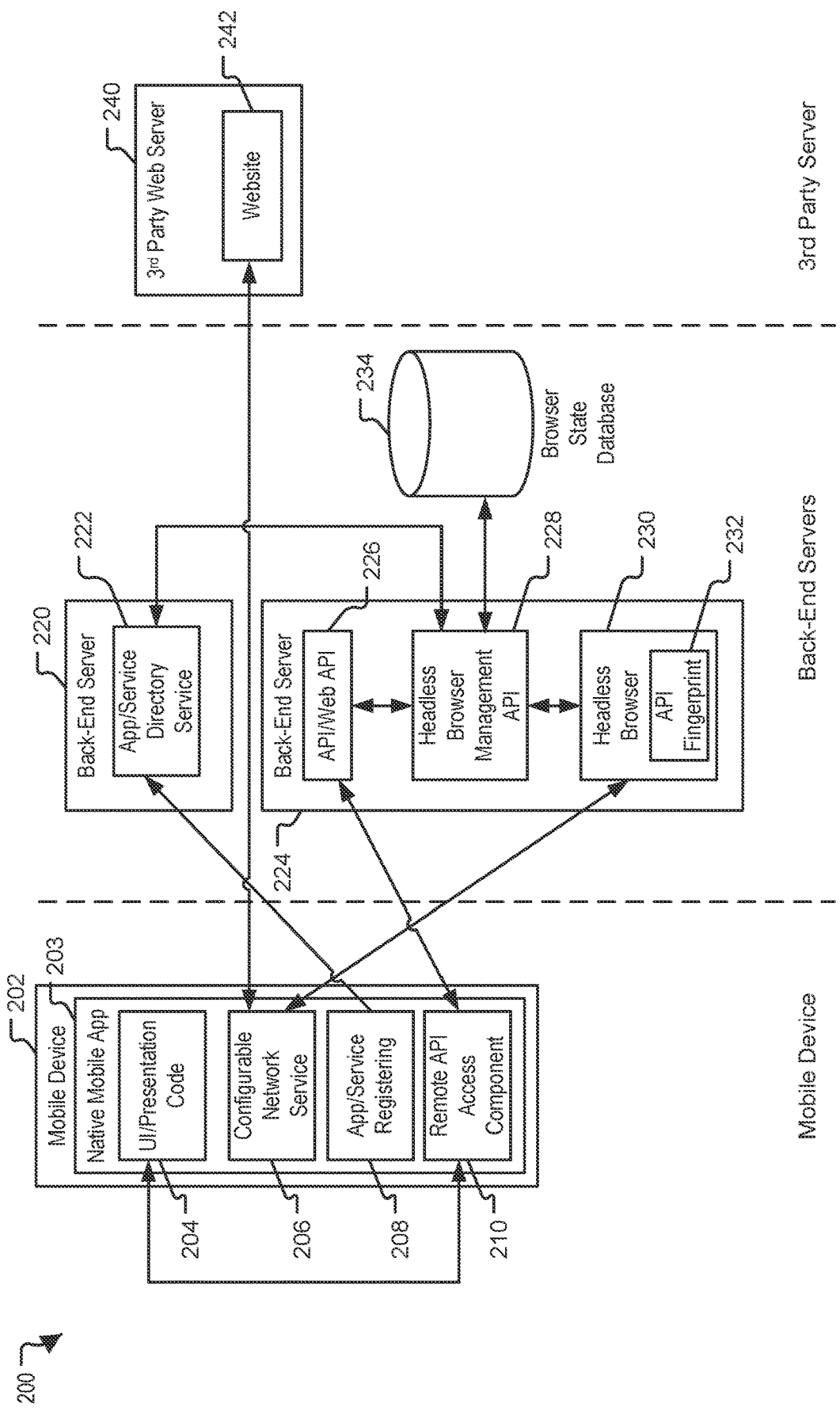
FIG. 2 is a diagram to illustrate another aspect of a system that supports secured data access from a mobile device executing a native application that is integrated with a server executing a headless browser.

FIG. 2 illustrates another aspect of a system 200 that supports secured data access from a mobile device executing a native application that is integrated with a server executing a headless browser. The system 200 includes a mobile device 202, a first back-end server 220, a second back-end server 224, and a third party web server 240. In a particular implementation, the mobile device 202 includes or corresponds to the mobile device 110, the first back-end server 220 and the second back-end server 224 include or correspond to the back-end server 120, and the third party web server 240 includes or corresponds to the web server 130 of FIG. 1. Although two back-end servers 220 and 224 are illustrated, in other implementations, more than two back-end servers may be included in the system 200, or a single back-end server may perform all the operations described with reference to the back-end servers 220 and 224.

The mobile device 202 is configured to execute a native mobile app 203. In a particular implementation, the native mobile app 203 includes or corresponds to the native app 112 of FIG. 1. The native mobile app 203 includes user interface (UI)/presentation code 204, a configurable network service 206, an app/service registering component 208, and a remote API access component 210. The first back-end server 220 includes an app/service directory service 222, and the second back-end server 224 includes an API/web API 226, a headless browser management API 228, and a headless browser 230. In a particular implementation, the configurable network service includes or corresponds to the configurable network service 115 and the headless browser 230 includes or corresponds to the headless browser 122 of FIG. 1. Each of the UI/presentation code 204, the configurable network service 206, the app/service registering component 208, and the remote API access component 210 may include processor-executable instructions that cause a processor of the mobile device 202 to perform the operations described herein. In alternate implementations, one or more of the UI/presentation code 204, the configurable network service 206, the app/service registering component 208, and the remote API access component 210 may be implemented in hardware, such as a field-programmable gate array (FPGA) or an application-specific integrated circuit (ASIC).

The UI/presentation code 204 is configured to generate displays, such as via a GUI (e.g., the GUI 113 of FIG. 1) and other visual content, in addition to providing user interface elements of the native mobile app 203. For example, the UI/presentation code 204 is responsible for generating the display of the native mobile app 203, including elements such as buttons, fields, boxes, and textual information, such as user-specific information including user name, account number(s), account balance(s), or other information. The UI/presentation code 204 is also configured to access a headless browser 230 at the second back-end server 224 in order to access secured data from the third party web server 240, as further described herein.

The configurable network service 206 is configured to receive requests from the second back-end server 224 (e.g., from the headless browser 230 executed by the second back-end server 224) and to forward the requests to the third party web server 240. For example, the configurable network service 206 may receive HTTP or HTTPS requests, as non-limiting examples, and may send the requests to the third party web server 240. Prior to sending the requests, the configurable network service 206 modifies the requests so that the requests appear to originate from the mobile device 202 instead of the second back-end server 224. For example, the configurable network service 206 may monitor headers of the requests to indicate the mobile device 202 as the originators of the requests. The configurable network service 206 is configurable to form a secure connection with the headless browser 230 executed by the second back-end server 224, as further described herein, to enable the configurable network service 206 to securely route requests from the headless browser 230 to the third party web server 240 and to route responses from the third party web server 240 to the headless browser 230 for processing.

The app/service registering component 208 is configured to register the native mobile app 203 with the back-end servers 220 and 224. For example, when the native mobile app 203 is launched, the app/service registering component 208 generates registration data that is sent to the first back-end server 220. The registration data includes a native mobile app ID of the native mobile app 203 (e.g., an ID that is unique to each instance of the native mobile app 203 on any device) in addition to an IP address and port assigned to the configurable network service 206. The registration data also optionally includes credential data that indicates one or more credentials (e.g., a username and password, etc.) that are used to provide security for the secure connection between the configurable network service 208 and the headless browser 230. The credential data is distinct from access credential data (e.g., a different username and a different password) used to login to the website 242. For example, the credential data may be generated by the native mobile app 203 independent of a user, whereas the access credential data includes a username and a password that are established by the user for accessing mobile banking features at the website 242. In a particular implementation, the credential data is randomly generated by the native mobile app 203 and passed to the first back-end server 220 as part of the registration data. The registration data is used by the headless browser management API 228 to setup a new headless browser instance, such as when a first request is sent from the remote API access component 210 to the second back-end server 224. The app/service registering component 208 is also configured to refresh (e.g., update) the registration data whenever an IP address change occurs at the mobile device 202. For example, if the mobile device 202 transitions from a cellular network (e.g., an LTE network) to a Wi-Fi network, or if an internet service provider (ISP) dynamically changes an assigned IP address, the app/service registering component 208 updates the registration data to indicate the new IP address (or any other change) and sends the updated registration data to the first back-end server 220.

The remote API access component 210 is configured to pass requests from the UI/presentation code 204 to the second back-end server 224. To illustrate, the remote API access component 210 may be in charge of sending requests to the second back-end server 224 and receiving responses from the second back-end server 224 in order to provide the UI/presentation code 204 with data that is needed to generate the display of the native mobile app 203.

The app/service directory service 222 is configured to maintain storage of registration data for one or more native mobile apps (e.g., for one or more mobile devices). For example, the registration data may indicate the native mobile app ID in addition to the IP address and port assigned to the configurable network service 206. The app/service directory service 222 may store the registration data, indexed by the native mobile app ID, in a memory of the first back-end server 220. In some implementations, the app/service directory service 222 is configured to create a secure connection (e.g., an encrypted network tunnel) between the IP address and port associated with the configurable network service 206 and an IP address and port of the second back-end server 224 that is used by the headless browser 230. This may simplify setup and use of the secure connection because the secure connection (e.g., the encrypted network tunnel) from the second back-end server 224 can be authenticated using IP address (e.g., the IP address where the headless browser instance is running in one of the back-end servers) instead of a username and password (or other means of authentication) to access the configurable network service 206 running at the mobile device 202. Alternatively, the registration data may include credential data that is used to authenticate the second back-end server 224 during a setup process of the secure connection. The credential data is distinct from (e.g., is not related to) a username and password used to access the website 242. Thus, because access credential data (e.g., a username and password associated with a login to the website 242) is not used to establish the secure connection (and is not included in the registration data), the access credential data is not stored on the back-end servers 220 and 224, which improves security as compared to systems that store personal identifiable information (e.g., the access credential data) at back-end servers.

The API/web API 226 is configured to forward requests or responses from the remote API access component 210 to the headless browser management API 228 for processing with the headless browser 230. The API/web API 226 may be a standard server/client API, such as a web API of a web server. For example, a request generated by the UI/presentation code 204 may be passed to the remote API access component 210 and sent to the API/web API 226. The API/web API may pass the received request to the headless browser management API 228 for operation with the headless browser 230. Similarly, a response to the request that is received by the headless browser 230 may be passed from the headless browser management API 228 may be passed to the API/web API 226 and sent to the remote API access component 210, which passes the response to the UI/presentation code 204 for display to the user via a GUI of the native mobile app 203.

The headless browser management API 228 is configured to receive requests forwarded from the UI/presentation code 204 to take action based on the requests or to fetch data on a given web page of a website 242 hosted by the third party web server 240. The headless browser management API 228 is also configured to create (e.g., instantiate) and destroy instances of the headless browser 230. To instantiate an instance (e.g., a session) of the headless browser 230, the headless browser management API 228 accesses the app/service directory service 222 to retrieve the IP address and port and credential data assigned to the configurable network service 206 (for setting up the secure connection to the configurable network service 206).

The headless browser management API 228 is also configured to access a browser state database 234 to determine whether any persistent state data is stored. For example, the headless browser management API 228 may determine whether persistent state data is stored for the native mobile app ID indicated by the stored registration data from the app/service directory service 222. The persistent state data may include one or more cookies, local storage, cached data, or a combination thereof, from a previous session of the headless browser 230. The browser state database 234 may be stored in a memory of the second back-end server 224 or may be external to the second back-end server 224. For example, the browser state database 234 may be stored in the cloud (e.g., at one or more external servers). If persistent state data is found for the native mobile app ID, the persistent state data is retrieved and used to recreate a previous session of the headless browser 230. If no persistent state data is found for the native mobile app ID, a new instance of the headless browser 230 is instantiated to process one or more requests received by the headless browser management API 228 from the API/web API 226.

The headless browser 230 is a web browser without a displayed GUI that is used to process the requests received from the native mobile app 203 (e.g., from the UI/presentation code 204 via the remote API access component 210). Additionally, the headless browser 230 is configured to communicate with the website 242 via the configurable network service 206. For example, the headless browser 230 may generate an HTTP or HTTPS request, as a non-limiting example, that is sent to the configurable network service 206 for transmission to the third party web server 240.

API fingerprint data 232 that corresponds to the website 242 may be embedded in (e.g., injected in) the headless browser 230 to enable the headless browser 230 to communicate with the website 242 (via the configurable network service 206). For example, the systems and methods of the present disclosure may create a "fingerprint" of the internet banking service pathways used for a user to log in, authenticate, and take other actions possible with internet banking. This unique service fingerprint may be stored (e.g., at the second back-end server 224 or in the cloud) and may be loaded (e.g., at runtime) into the headless browser 230 as an embedded (e.g., injected) API component that configures headless browser interaction with the native mobile app 203 and the website 242. This fingerprint may also enable identification of changes that occur to the internet banking software (e.g., the website 242). These changes may trigger automated validation processes that verify that user accounts can (continue to) be accessed correctly. In the event that there is a change detected in the API fingerprint for a given bank or credit union, a process may be triggered to update the fingerprint to incorporate changes so that normal operations can be restored. For each bank or credit union, there may be a unique fingerprint ID to configure how the API interacts between the headless browser 230 and the internet banking software. It may be possible for the API system to load more than one fingerprint per application, thereby enabling the native mobile app 203 to directly access internet banking software for more than one bank or credit union on behalf of a user that has valid credentials at multiple institutions. This also enables the native mobile app 203 to be independently branded and enables consumers to access any fingerprinted internet banking system. If configured in this manner, users may select their financial institution from among multiple fingerprinted organizations prior to initial login. Alternatively, a different instance of the headless browser 230 may be instantiated for each different bank or credit union.

In some aspects, the native mobile app 203 uses the headless browser 230 to send and receive information to and from the internet banking system (via the configurable network service 206) through an established interface. Once a system for a bank or credit union is fingerprinted for use by an embedded API, the native mobile app 203 may provide access credential data, such as username, password, and any additional information needed to authenticate (e.g., multi-factor authentication code, etc.). The need to pass in additional authentication information would be determined by the headless browser 230 parsing the initial response to the application passing in the username/password. If the website 242 responds in a way that was previously fingerprinted as being associated with a multi-factor authentication request, the native mobile app 203 may prompt the user to enter such information, which may be obtained via an out-of-band channel, such as e-mail or text message. Similarly, if the website 242 responds to an authentication attempt with a multi-factor authentication challenge, a fingerprint may indicate how to respond to such a challenge, and the headless browser 230 may parse the challenge so that the challenge can be relayed to the mobile device 202 for display to the user in the GUI of the native mobile app 203. The resulting response from the user would then be passed back through the embedded API into the headless browser 230 and then relayed from the headless browser 230 via the configurable network service 206 to the third party web server 240 hosting the internet banking website.

Alternatively, the third party web server 240 may reject/fail the authentication and provide an error status/page. In this scenario, the error/status page may have been pre-mapped and fingerprinted. The error status would be parsed and passed back to the native mobile app 203 by the embedded API for display to the user, so that the user can take action (e.g., by re-entering the correct information, etc.). The embedded API may thus function as a mapping of all potential interactions and responses between the website 242/third party web server 240/internet banking pages and the actions that the user can take in the native mobile app 203.

During operation, the native mobile app 203 registers with the first back-end server 220. For example, the app/service registering component 208 sends registration data, such as the registration data 124 of FIG. 1, to the first back-end server 220. The registration data may include a native mobile app ID of the native mobile app 203 and an IP address and port assigned to the configurable network service 206. In some implementations, the registration data also includes credential data used to setup a secure connection between the headless browser 230 and the configurable network service 206. The app/service directory service 222 at the first back-end server 220 stores the registration data for later use in establishing the secure connection between the headless browser 230 and the configurable network service 206. Additionally, the UI/presentation code 204 generates the GUI of the native mobile app 203 for display to a user. When a user interacts with the GUI, such as by selecting a bank to login to and entering access credentials (e.g., a username and password) for logging on to the website 242, the UI/presentation code 204 generates a request, such as the request 125 of FIG. 1. The request is passed to the remote API access component 210, and the remote API access component 210 sends the request to the API/web API 226 at the second back-end server 224. The API/web API 226 receives the request and passes the request to the headless browser management API 228.

The headless browser management API 228 initiates launch of the headless browser 230 based on receiving the request. In a particular implementation, the headless browser management API 228 access the browser state database 234 to determine whether persistent state data exists for the native mobile app ID. If persistent state data for the native mobile app ID is stored at the browser state database 234, the persistent state data is retrieved and loaded into the headless browser 230 to recreate a previous headless browser session. Multi-factor authentication challenges may be facilitated by session and cookie-handling of the headless browser 230, leveraging security protocols for internet banking that are already in place. Alternatively, if no persistent state data is found, the headless browser management API 228 instantiates a new session of the headless browser 230. Additionally, the headless browser management API 228 may access the app/service directory service 222 to initiate formation of a secure connection between the headless browser 230 and the configurable network service 206. For example, a secure connection (e.g., an encrypted network tunnel) may be created between the IP address and port of the configurable network service 206 and an IP address and port at the second back-end server 224. As part of the process of creating the secure connection, the second back-end server 224 may be authenticated based on credential data included in the registration data managed by the app/service directory service 222.

The headless browser management API 228 may also determine the API fingerprint data 232 that corresponds to the website 242 and embed (e.g., inject) the API fingerprint data 232 into the headless browser 230 such that an API between the website 242 and the native mobile app 203 is formed. For example, the API fingerprint data 232 may indicate mappings between elements, such as a login button, of the native mobile app 203 and the website 242. Based on the API fingerprint data 232, the headless browser 230 generates a request, such as the second request 126 of FIG. 1, to login to the website 242. The request is sent via the secure connection to the configurable network service 206. The configurable network service 206 receives the request and generates a new request, such as the third request 136 of FIG. 1, that appears to the website 242 (or the third party web server 240) to originate at the mobile device 202. For example, the configurable network service modifies a header of the request prior to sending the request, and the modified header indicates the mobile device 202 as the originator of the request (e.g., the third request 136 of FIG. 1). In this manner, the configurable network service 206 anonymizes the second back-end server 224, and it appears to the third party web server 240 that all requests come from the mobile device 202.

After sending the request, the configurable network service 206 may receive web page data, such as the web page data 134 of FIG. 1, from the website 242. The configurable network service 206 forwards the web page data 134 to the second back-end server 224 for processing via the headless browser 230. For example, the headless browser 230 may be used to parse the web page data to identify user-specific data, such as account number(s), account balance(s), etc. The user specific information may be passed by the headless browser management API 228 to the API/web API 226 for transmission to the remote API access component 210. The remote API access component 210 receives the user-specific data and passes the user-specific data to the UI/presentation code for display to the user via the GUI of the native mobile app 203.

In this manner, the mobile device 202 operates with the back-end servers 220 and 224 to access secured data at the website 242 while appearing as though the access originates at the mobile device 202, and not the second back-end server 224. To illustrate, the headless browser 230 may act as an integration layer that presents a unique, distributed, secure web browsing session in real-time or near-real-time to the internet banking system. In contrast to other approaches, access by the headless browser 230 on behalf of the native mobile app 203 directly relates to authorized user activity on behalf of the financial institution and is identical in terms of access traffic to a mobile browser login originating from the same device. This has substantial security, performance, integration, operational and business benefits. By leveraging headless browser technology, this approach enables direct interaction in real-time or near-real-time for both "read" and "write" activity for a user's accounts without requiring a direct mobile integration interface (e.g., a direct mobile integration, such as a customized mobile application created by a financial institution).

It should be noted that unlike other systems which may utilize a headless browser, the techniques of the present disclosure do not execute the user interface in the headless browser and then translate a resulting experience to a client. Rather, the "client" native mobile app may have a fixed user interface that does not vary in presentation based on a server-side website. Instead, the client user interface may be defined at the point the native app is published to an app store. Moreover, in the techniques of the present disclosure, the headless browser is used to create a secure, standards-based browser session with internet banking. Before the native app is published, an embedded API configuration is created for a bank or credit union, and the embedded API configuration defines the internet banking functions available and the expected methods in HTML/JavaScript for reading/writing that information to the internet banking site. This configuration may be different for different banks/credit unions and may correspond to items, such as username or password, transaction information, etc. Each such item may be pre-mapped in the configuration against the banking application API, which may be standardized across all branded "versions" of the native app. Thus, in some aspects, a particular native app may only be compatible for use on a specific website and/or a specific version of internet banking software. In the systems and methods of the present disclosure, the headless browser does not rely on translation between the website's interface and the banking app. Instead, the headless browser may be used as a secure pipe over an open network interface.

Figure 3:
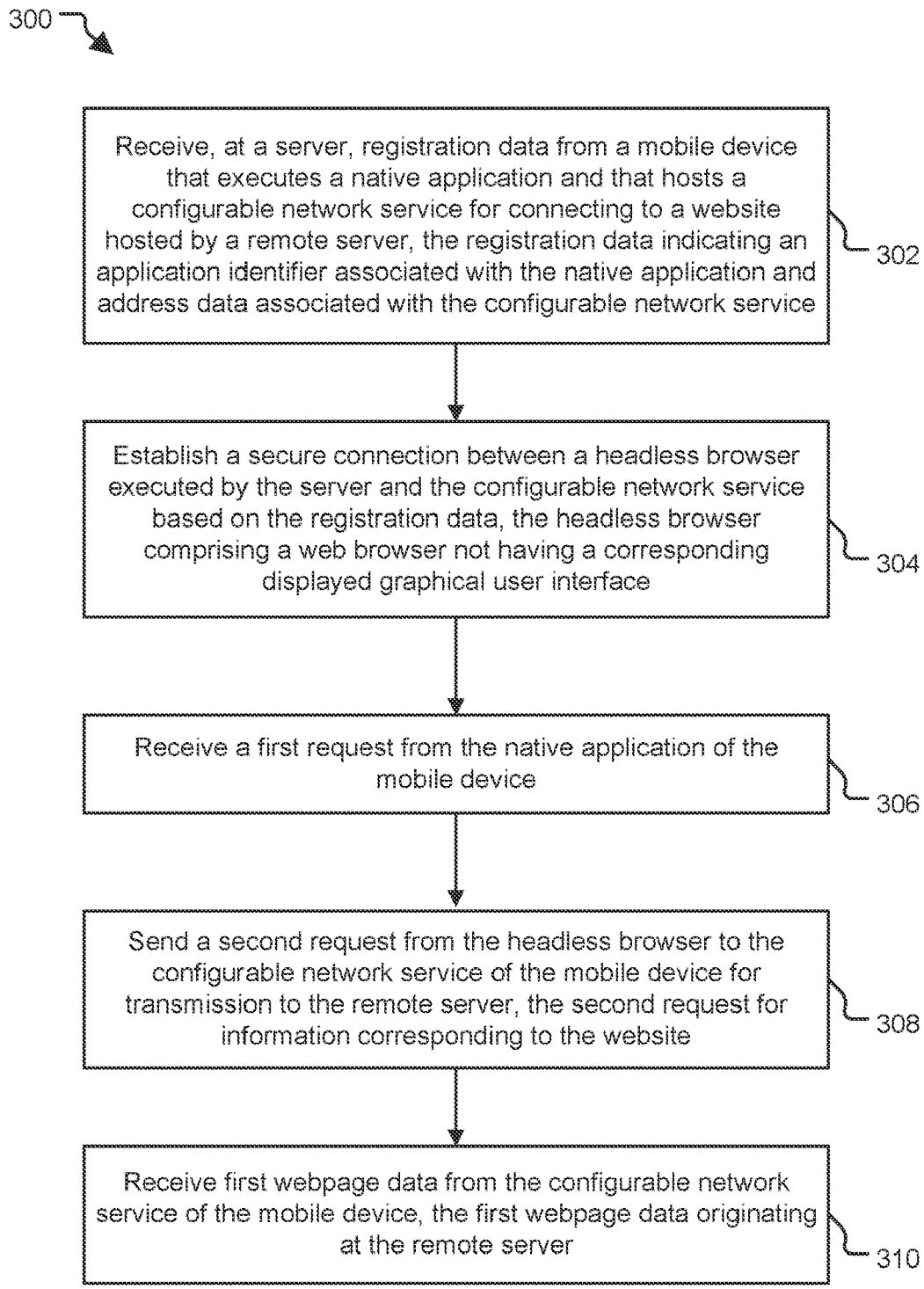
FIG. 3 is a flowchart to illustrate a method of operation at a server.

Referring to FIG. 3, an illustrative aspect of a method 300 of operation at a server is shown. In particular examples, the method 300 may be performed by the back-end server 120 of FIG. 1 or the back-end servers 220, 224 of FIG. 2.

The method 300 includes receiving, at a server, registration data from a mobile device that executes a native application and that hosts a configurable network service for connecting to a website hosted by a remote server, at 302. For example, the back-end server 120 of FIG. 1 receives the registration data 124 from the mobile device 110. The registration data indicates an application identifier associated with the native application and address data associated with the configurable network resource. For example, the registration data 124 includes an application identifier (e.g., a unique identifier) of the native app 112 and an IP address and port assigned to the configurable network service 115 of FIG. 1. In some implementations, the registration data optionally includes credential data associated with establishing a secure connection with the configurable network service. In a particular implementation, the credential data is randomly (or pseudo randomly) generated.

The method 300 includes establishing a secure connection between a headless browser executed by the server and the configurable network service based on the registration data, at 304. For example, the back-end server 120 establishes a secure connection between the headless browser 122 at the back-end server 120 and the configurable network service 115 at the mobile device 110. The headless browser includes a web browser not having a corresponding displayed graphical user interface.

The method 300 includes receiving a first request from the native application of the mobile device, at 306. For example, the back-end server 120 receives the request 125 from the native app 112 of the mobile device 110.

The method 300 includes sending a second request from the headless browser to the configurable network service of the mobile device for transmission to the remote server, at 308. The second request is for information corresponding to the website. For example, the back-end server 120 sends the second request 126 to the configurable network service 115 at the mobile device 110, and the configurable network service 115 modifies the second request 126 before forwarding the modified second request (e.g., the third request 136) to the web server 130.

The method 300 also includes receiving first webpage data from the configurable network service of the mobile device, at 310. The first webpage data originates at the remote server. For example, the back-end server 120 receives the web page data 134 from the configurable network service 115 of the mobile device 110. The web page data originates at the web server 130.

In a particular implementation, the method 300 includes receiving access credential data from the mobile device at the server and generating the second request based on the access credential data and based on application programming interface (API) data associated with the website. For example, the request 125 of FIG. 1 may include or indicate access credential data and the back-end server 120 of FIG. 1 may generate the second request 126 based on the API fingerprint data 121. The method 300 may also include connecting to the remote server via the configurable network service based on the access credential data and generating persistent state data based on a state of the headless browser after connecting to the remote server. For example, the configurable network service 115 of the mobile device 110 may operate to connect the back-end server 120 to the web server 130 while preserving anonymity of the back-end server 120 (e.g., to the web server 130, the access appears to be the same as an access that would be generated by a web browser of the mobile device 110). Additionally, the back-end server 120 of FIG. 1 generates the persistent state data 129 and stores the persistent state data 129 at the browser state database 128 when an indication that the native app 112 has been closed is received. In a particular implementation, the access credential data is not stored at the back-end server.

Figure 4:
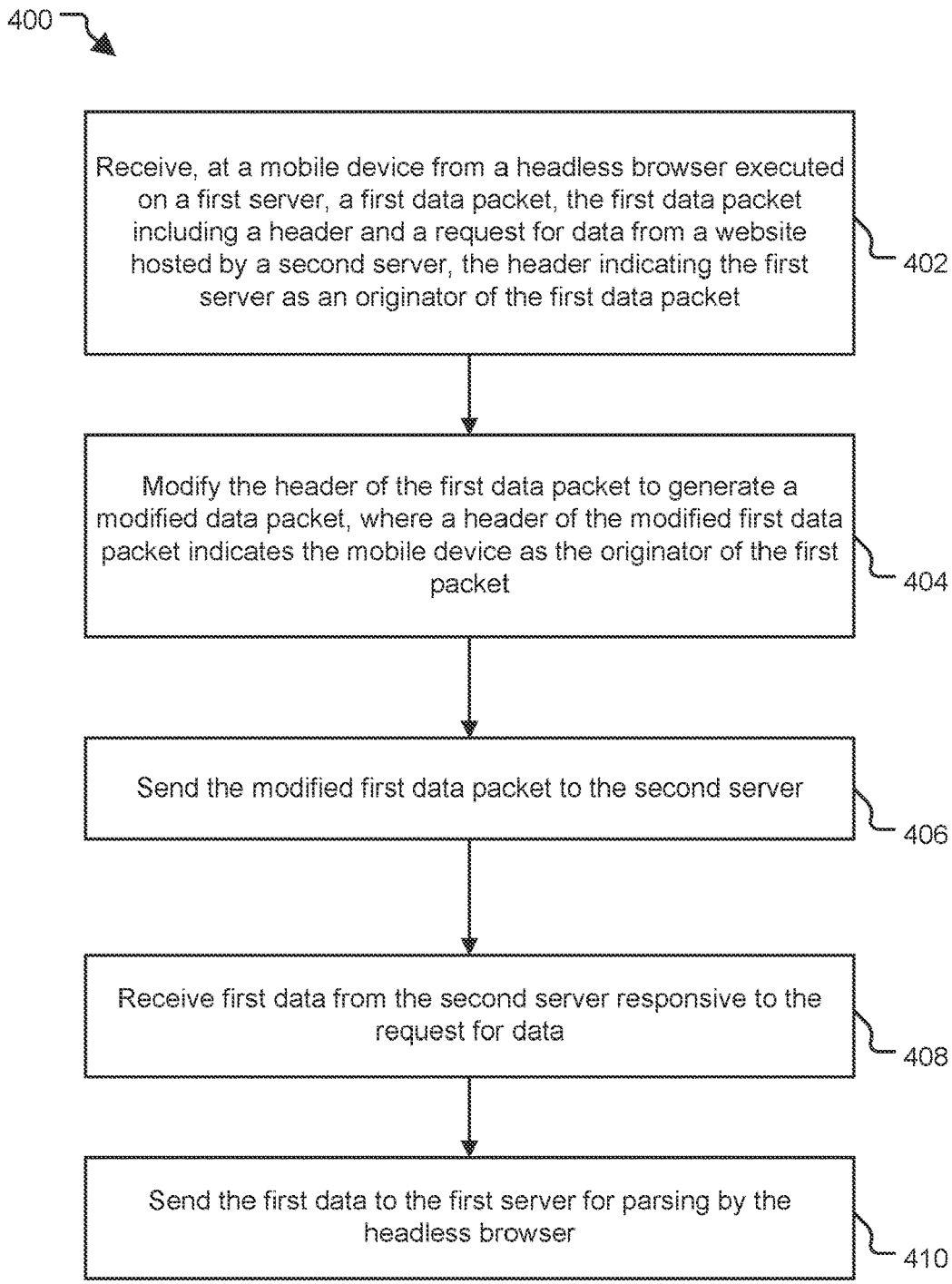
FIG. 4 is a flowchart to illustrate a method of operation at a mobile device.

Referring to FIG. 4, an illustrative aspect of a method 400 of operation at a mobile device is shown. In particular examples, the method 400 may be performed by the mobile device 110 of FIG. 1 or the mobile device 202 of FIG. 2.

The method 400 includes receiving, at a mobile device from a headless browser executed on a first server, a first data packet, at 402. The first data packet includes a header and a request for data from a website hosted by a second server. The header indicates the first server as an originator of the first data packet. For example, the mobile device 110 of FIG. 1 receives the second request 126 from the back-end server 120.

The method 400 includes modifying the header of the first data packet to generate a modified data packet, at 404. A header of the modified first data packet indicates the mobile device as the originator of the first packet. For example, the mobile device 110 modifies the first header 127 of the second request 126 to generate a modified first data packet (e.g., the third request 136 of FIG. 1). The second header 137 of the third request 136 indicates the mobile device 110 as the originator of the third request 136.

The method 400 sending the modified first data packet to the second server, at 406. For example, the mobile device 110 of FIG. 1 sends the third request 136 to the web server 130.

The method 400 includes receiving first data from the second server responsive to the request for data, at 408. For example, the mobile device 110 receives the web page data 134 from the web server 130.

The method 400 also includes sending the first data to the first server for parsing by the headless browser, at 410. For example, the mobile device 110 of FIG. 1 sends the web page data 134 to the back-end server 120 for parsing by the headless browser 122.

In a particular implementation, the method 400 includes, responsive to executing the native application, generating registration data and sending the registration data to the first server. The registration data includes an application identifier associated with the native application, address information associated with a configurable network service that communicates with the second server, and credential data associated with establishing a secure connection with the configurable network service. For example, the mobile device 110 of FIG. 1 generates and sends the registration data 124 to the back-end server 120. The registration data 124 of FIG. 1 includes an application identifier associated with the native app 112, an IP address and port (e.g., address information) assigned to the configurable network service 115, and credential data indicative of credentials (e.g., a username and password, etc.) used to secure the connection between the headless browser 122 and the configurable network service 115. In a particular implementation, the credential data is randomly (or pseudo randomly) generated by the native app 112. The method 400 may also include establishing a secure connection between the configurable network service and the headless browser. For example, a secure connection, such as an encrypted network tunnel, may be established between the headless browser 122 at the back-end server 120 and the configurable network service 115 at the mobile device 110. Establishing the secure connection may include authenticating the back-end server 120 based on the credential data included in the registration data 124.

In another particular implementation, the method 400 includes receiving persistent state data from the first server and storing the persistent state data at a memory of the mobile device. For example, the mobile device 110 of FIG. 1 may receive the persistent state data 129 and may store the persistent state data 129 at a memory. After launching the native app 112, the persistent state data 129 may be sent to the back-end server 120 for use in setting up the headless browser 122.

It is to be understood that in alternative aspects, one or more steps of the methods 300, 400 of FIGS. 3-4 may be performed in a different order, may be combined or performed at least partially concurrently, or may be omitted. Further, one or more other steps may be added.

Figure 5:
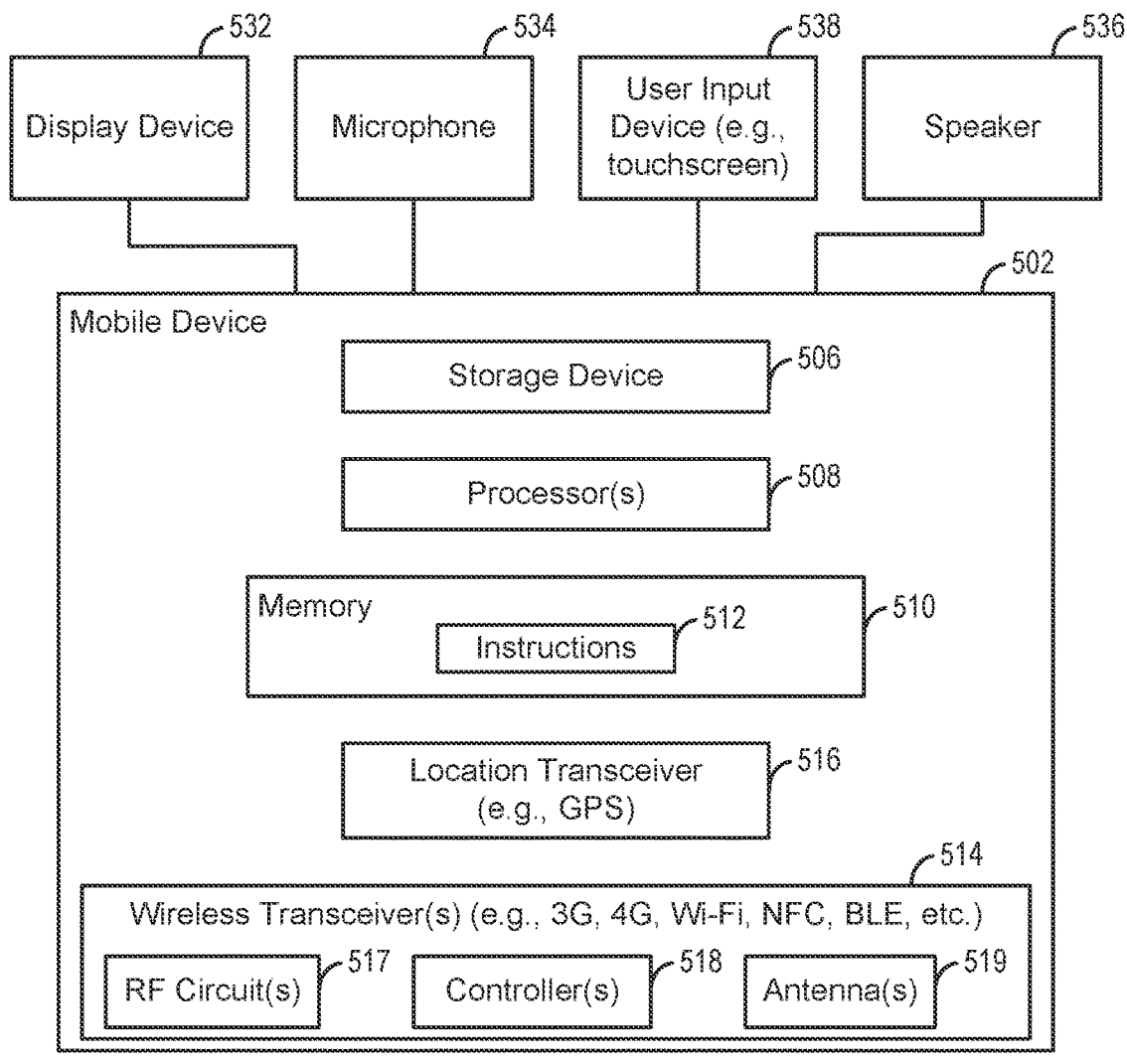
FIG. 5 is a block diagram of an illustrative aspect of a mobile device operable to support methods, apparatuses, and computer-readable storage devices disclosed herein.

Referring to FIG. 5, an illustrative example of a mobile device 502 is shown. The mobile device 502 may be configured to perform one or more of the functions and methods described above with reference to FIGS. 1-4. In a particular implementation, the mobile device 502 may include or correspond to the mobile device 110 of FIG. 1 or the mobile device 202 of FIG. 2.

The mobile device 502 includes a computer-readable storage device 506, one or more processors 508 (e.g., a central processing unit (CPU), a digital signal processor (DSP), a graphics processing unit (GPU), etc.) and a memory 510. The storage device 506 may be implemented as read-only memory (ROM), random access memory (RAM), and/or persistent storage, such as a hard disk drive, a flash memory device, or other type of storage device. The memory 510 is configured to store instructions 512 executable by the processor 508 to perform one or more of the functions or methods described above with reference to FIGS. 1-4. As non-limiting examples, the memory 510 may be configured to store the native app 112 of FIG. 1 or the native mobile app 203 of FIG. 2. The computer-readable storage device 506 is not a signal.

The mobile device 502 also includes a location device 516 (e.g., a GPS transceiver) and one or more wireless transceivers 514 that enable the mobile device 502 to exchange signals with (e.g., receive signals from and/or send signals to) other devices. Each wireless transceiver 514 may include or be coupled to radio frequency (RF) circuitry 517, a controller 518, and/or an antenna 519. In illustrative examples, the wireless transceivers 514 include a third generation (3G) transceiver, a fourth generation (4G) transceiver, a Wi-Fi transceiver, a near field communication (NFC) transceiver, a BLUETOOTH™ (BLUETOOTH™ is a registered trademark of Bluetooth SIG, Inc. of Kirkland, Washington, USA) or BLUETOOTH™ low energy (BLE) transceiver, or any combination thereof. In the example of FIG. 5, the mobile device 502 is configured to utilize one or more of the wireless transceivers 514 for direct peer-to-peer communication and communication via one or more networks 524, such as the internet. To illustrate, the mobile device 502 may communicate with an external device 526 (e.g., an automated teller machine (ATM) for contact-less ATM authentication) via a peer-to-peer wireless channel (e.g., BLUETOOTH™ BLE, or NFC) and may communicate with the web server 130 hosting the website 132 via a cellular or Wi-Fi wireless channel.

In the example of FIG. 5, the mobile device 502 includes or is coupled to input devices and output devices. For example, the mobile device 502 may include or may be coupled to a display device 532, a microphone 534, a speaker 536, and/or a user input device 538 (e.g., a touchscreen). It should be noted that, while illustrated as outside of the mobile device 502, one or more of the devices 532-538 may be integrated into a housing of the mobile device 502, such as in the case of a mobile phone or tablet computer.

Figure 6:
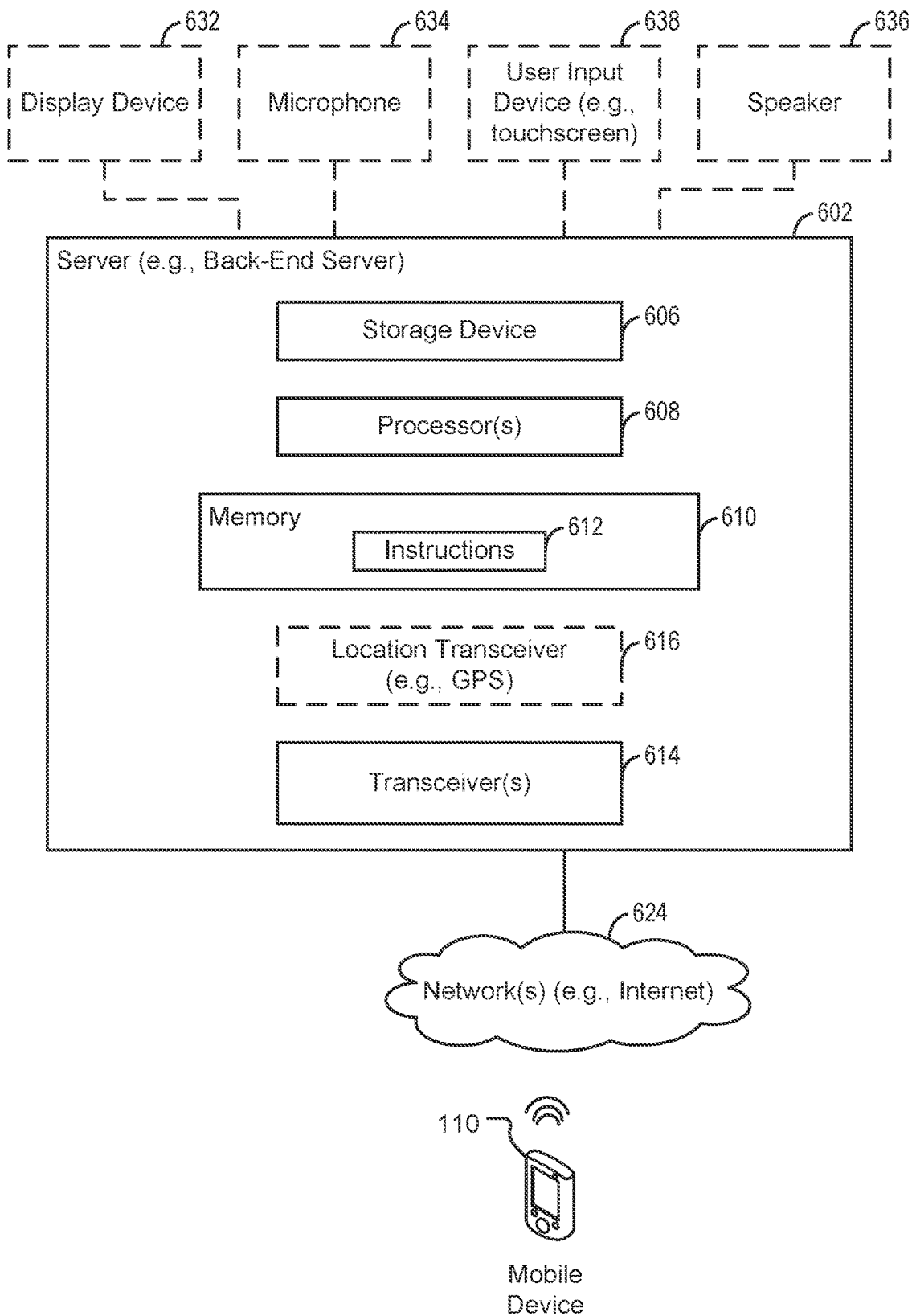
FIG. 6 is a block diagram of an illustrative aspect of a server to support methods, apparatuses, and computer-readable storage devices disclosed herein.

Referring to FIG. 6, an illustrative example of a server 602 is shown. The server 602 may be configured to perform one or more of the functions and methods described above with reference to FIGS. 1-4. In a particular implementation, the server 602 includes or corresponds to the back-end server 120 of FIG. 1 or the back-end servers 220, 224 of FIG. 2.

The server 602 includes a computer-readable storage device 606, one or more processors 608 (e.g., a central processing unit (CPU), a digital signal processor (DSP), a graphics processing unit (GPU), etc.) and a memory 610. The storage device 606 may be implemented as read-only memory (ROM), random access memory (RAM), and/or persistent storage, such as a hard disk drive, a flash memory device, or other type of storage device. The memory 610 is configured to store instructions 612 executable by the processor 608 to perform one or more of the functions or methods described above with reference to FIGS. 1-4. The computer-readable storage device 606 is not a signal.

The server 602 also includes one or more transceivers 614 that enable the server 602 to exchange signals with (e.g., receive signals from and/or send signals to) other devices. In some implementations, the transceivers 614 are wireless transceivers, and each transceiver 614 may include or be coupled to radio frequency (RF) circuitry, a controller, and/or an antenna. In illustrative examples, the transceivers 614 include a third generation (3G) transceiver, a fourth generation (4G) transceiver, a Wi-Fi transceiver, a near field communication (NFC) transceiver, a BLUETOOTH or BLUETOOTH low energy (BLE) transceiver, a wired transceiver, or any combination thereof. In the example of FIG. 6, the server 602 is configured to utilize one or more of the transceivers 614 for communication via one or more networks 624, such as the internet. To illustrate, the server 602 may communicate with mobile device 110 via the internet.

The server 602 optionally includes a location device 616 (e.g., a GPS transceiver). In the example of FIG. 6, the server 602 also optionally includes or is coupled to input devices and output devices. For example, the server 602 may optionally include or may be coupled to a display device 632, a microphone 634, a speaker 636, a user input device 638 (e.g., a touchscreen), or a combination thereof.

In conjunction with the described aspects, a server includes a transceiver configured to communicate with a mobile device configured to execute a native application and configured to host a configurable network service for connecting to a website hosted by a remote server. The server includes a processor. The server also includes a memory storing instructions that are executable by the processor to perform operations including receiving registration data from the mobile device. The registration data indicates an application identifier associated with the native application and address data associated with the configurable network service. The operations include initiating establishment of a secure connection between a headless browser and the configurable network service based on the registration data. The headless browser includes a web browser not having a corresponding displayed graphical user interface. The operations include receiving a first request from the native application of the mobile device. The operations include initiating sending of a second request from the headless browser to the configurable network service of the mobile device for transmission to the remote server. The second request is for information corresponding to the website. The operations also include receiving first webpage data from the configurable network service of the mobile device. The first webpage data originates at the remote server.

In conjunction with the described aspects, a method includes receiving, at a server, registration data from a mobile device that executes a native application and that hosts a configurable network service for connecting to a website hosted by a remote server. The registration data indicates an application identifier associated with the native application and address data associated with the configurable network service. The method includes establishing a secure connection between a headless browser executed by the server and the configurable network service based on the registration data. The headless browser includes a web browser not having a corresponding displayed graphical user interface. The method includes receiving a first request from the native application of the mobile device. The method includes sending a second request from the headless browser to the configurable network service of the mobile device for transmission to the remote server. The second request is for information corresponding to the website. The method also includes receiving first webpage data from the configurable network service of the mobile device. The first webpage data originates at the remote server.

In conjunction with the described aspects, a computer-readable storage device stores instructions that, when executed by a processor, cause the processor to perform operations including receiving, at a server, registration data from a mobile device that executes a native application and that hosts a configurable network service for connecting to a website hosted by a remote server. The registration data indicates an application identifier associated with the native application and address data associated with the configurable network service. The operations include establishing a secure connection between a headless browser executed by the server and the configurable network service based on the registration data. The headless browser includes a web browser not having a corresponding displayed graphical user interface. The operations include receiving a first request from the native application of the mobile device. The operations include sending a request from the headless browser to the configurable network service of the mobile device for transmission to the remote server. The second request is for information corresponding to the website. The operations also include receiving first webpage data from the configurable network service of the mobile device. The first webpage data originates at the remote server.

In conjunction with the described aspects, a mobile device includes a wireless transceiver configured to communicate with a first server and a second server. The first server is configured to execute a headless browser. The second server is configured to host a website. The mobile device includes a display device. The mobile device includes a processor coupled to the wireless transceiver and the display device. The mobile device also includes a memory coupled to the processor and storing a native application that is executable by the processor to perform operations including receiving, from the headless browser, a first data packet. The first data packet includes a header and a request for data from the website. The header indicates the first server as an originator of the first data packet. The operations include modifying the header of the first data packet to generate a modified first data packet. A header of the modified first data packet indicates the mobile device as the originator of the first data packet. The operations include initiating sending of the modified first data packet to the second server via the wireless transceiver. The operations include receiving first data from the second server via the wireless transceiver responsive to the request for data. The operations include initiating sending of the first data to the first server for parsing by the headless browser.

In conjunction with the described aspects, a method includes receiving, from a headless browser executed at a first server, a first data packet. The first data packet includes a header and a request for data from a website hosted by a second server. The header indicates the first server as an originator of the first data packet. The method includes modifying the header of the first data packet to generate a modified first data packet. A header of the modified first data packet indicates the mobile device as the originator of the first data packet. The method includes sending the modified first data packet from the mobile device to the second server. The method includes receiving first data from the second server at the mobile device responsive to the request for data. The method also includes sending the first data from the mobile device to the first server for parsing by the headless browser.

In conjunction with the described aspects, a computer-readable storage device stores instructions that, when executed by a processor, cause the processor to perform operations including receiving, from a headless browser executed at a first server, a first data packet. The first data packet includes a header and a request for data from a website hosted by a second server. The header indicates the first server as an originator of the first data packet. The operations include modifying the header of the first data packet to generate a modified first data packet. A header of the modified first data packet indicates the mobile device as the originator of the first data packet. The operations include sending the modified first data packet from the mobile device to the second server. The operations include receiving first data from the second server at the mobile device responsive to the request for data. The operations also include sending the first data from the mobile device to the first server for parsing by the headless browser.

The illustrations and aspects of the disclosure described herein are intended to provide a general understanding of the disclosure and are not intended to exhaustively illustrate all possible aspects, some of which may incorporate substitute arrangements to achieve the same or similar objectives. The present disclosure covers any and all subsequent adaptations or variations of aspects described herein.

It is to be understood that the figures may not be drawn to scale, and the Abstract is not to be used to interpret or limit the scope or meaning of the claims. In addition, the use of the terms invention, embodiment, aspect, or example do not require that the described features be grouped together. The disclosure is not to be interpreted as intending any claimed aspect, example, or embodiment to require more elements than recited in a claim.

The subject matter described herein is thus illustrative rather than restricting, and the claims are intended to cover all falling within the scope of the present disclosure. To the maximum extent allowed by law, the scope of the present disclosure is to be determined by the broadest permissible interpretation of the following claims (which are hereby incorporated into the detailed description) and their equivalents, and shall not be restricted or limited by the foregoing detailed description.

What is claimed:

1. A mobile device comprising:
   a wireless transceiver configured to communicate with at least a first server and a second server, the first server configured to execute a headless browser, the headless browser being web browser that is executed by the first server without display of a graphical user interface (GUI), the second server configured to host a website;
   a display device;
   a processor coupled to the wireless transceiver and the display device; and
   a memory coupled to the processor and storing a native application that is executable by the processor to perform operations comprising:
      receiving, from the headless browser, a first data packet, the first data packet including a header and a request for data from the website, the header indicating the first server as an originator of the first data packet;
      modifying the header of the first data packet to generate a modified first data packet, wherein a header of the modified first data packet indicates the mobile device as the originator of the first data packet, wherein an IP address or other identifying information associated with the first server is replaced with an IP address or other identifying information associated with the mobile device;
      initiating sending of the modified first data packet to the second server via the wireless transceiver;
      receiving first data from the second server via the wireless transceiver responsive to the request for data;
      initiating sending of the first data to the first server for parsing by the headless browser;
      responsive to executing the native application, generating registration data, the registration data including an application identifier associated with the native application, address information associated with a configurable network service that communicates with the second server, browser state information, and credential data associated with establishing a secure connection with the configurable network service; and
      initiating sending of the registration data to the first server.

2. The mobile device of claim 1, further comprising a display device configured to display a graphical user interface (GUI) based at least on information received from the first server.

3. A server comprising:
   a transceiver configured to communicate with a mobile device;
   a processor; and
   a memory that stores instructions that are executable by the processor to perform operations comprising:
   receiving:
      registration data from the mobile device, the registration data including application identifier information associated with a native application executed at the mobile device,
      address information associated with a configurable network service hosted by the mobile device, the configurable network service configured for connecting to a website hosted by a remote server, and
      browser state information;
   initiating a secure connection between a headless browser executed at the processor and the configurable network service based at least on the registration data, the headless browser comprising a web browser not having a corresponding displayed graphical user interface;

receiving a first request from the native application of the mobile device;

initiating sending of a second request from the headless browser to the configurable network service of the mobile device for transmission to the remote server, the second request being for information corresponding to the website;

receiving first webpage data from the configurable network service of the mobile device, the first webpage data originating at the remote server; and receiving access credential data from a secure element in the mobile device, wherein the second request indicates the access credential data, and wherein the access credential data is associated with the website.

4. A method comprising:

receiving, at a server, at least registration data and browser state information, the registration data and the browser state information from a mobile device, a browser state database or a shared folder, the mobile device configured to execute a native application and configured to host a configurable network service to connect to a website hosted by a remote server, the registration data including application identifier information associated with the native application and address data associated with the configurable network service; and establishing a secure connection between a headless browser, using the browser state information and the registration data, and the configurable network service, the headless browser comprising a web browser not having a corresponding displayed graphical user interface;

receiving a first request from the native application of the mobile device;

sending a second request from the headless browser to the configurable network service of the mobile device for transmission to the remote server, the second request for information corresponding to the website;

receiving first webpage data from the configurable network service of the mobile device, the first webpage data originating at the remote server receiving access credential data from the mobile device at the server;

generating the second request based on the access credential data and based on application programming interface (API) data associated with the website, connecting to the remote server via the configurable network service based on the access credential data; and generating persistent state data based on a state of the headless browser after connecting to the remote server.

5. The method of claim 4, wherein the browser state information is encrypted.

6. The method of claim 5, wherein encryption keys are stored in a keys database, on a server, on a third party server or the mobile device.

7. The method of claim 6, where the keys are stored in plaintext, are further encrypted or stored in a secure element.

* * * * *